(12) United States Patent
Kim et al.

(10) Patent No.: US 12,243,415 B2
(45) Date of Patent: *Mar. 4, 2025

(54) APPARATUS AND METHOD FOR CONTROLLING VEHICLE SEAT

(71) Applicants: Hyundai Motor Company, Seoul (KR); Kia Corporation, Seoul (KR)

(72) Inventors: Ki Chang Kim, Gyeonggi-do (KR); Tae Kun Yun, Gyeonggi-do (KR); Dong Chul Park, Gyeonggi-do (KR); Kyoung Jin Chang, Gyeonggi-do (KR); Eun Soo Jo, Gyeonggi-do (KR); Jin Sung Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 346 days.

This patent is subject to a terminal disclaimer.

(21) Appl. No.: 17/880,014

(22) Filed: Aug. 3, 2022

(65) Prior Publication Data
US 2023/0191954 A1 Jun. 22, 2023

(30) Foreign Application Priority Data
Dec. 21, 2021 (KR) .................. 10-2021-0184311

(51) Int. Cl.
*G08B 6/00* (2006.01)
*B60N 2/00* (2006.01)
(Continued)

(52) U.S. Cl.
CPC ............. *G08B 6/00* (2013.01); *B60N 2/0027* (2023.08); *B60N 2/0273* (2023.08);
(Continued)

(58) Field of Classification Search
None
See application file for complete search history.

(56) References Cited

U.S. PATENT DOCUMENTS

| 6,592,533 B1 | 7/2003 | Yonekawa et al. |
| 10,732,713 B2 | 8/2020 | Min et al. |
| (Continued) |

FOREIGN PATENT DOCUMENTS

| KR | 0132348 B1 | 4/1998 |
| KR | 10-0323632 B1 | 2/2002 |
| (Continued) |

*Primary Examiner* — Peter D Nolan
*Assistant Examiner* — Jacob Kent Besteman-Street
(74) *Attorney, Agent, or Firm* — Fox Rothschild LLP

(57) ABSTRACT

Disclosed are an apparatus and a method for controlling a vehicle seat so as to control a seat back and a neck pillow based on a sound. The apparatus includes the vehicle seat installed in a vehicle and including a seat back and a neck pillow, a detector for detecting vehicle information and seat information, and a processor connected to the vehicle seat and the detector, wherein the processor determines a vehicle state and a seat sitting posture based on the vehicle information and the seat information, analyzes a sound being reproduced in the vehicle, determines a haptic pattern and a haptic pressure based on the vehicle state and the seat sitting posture, and the analysis of the sound, and controls the seat back and the neck pillow based on the determined haptic pattern and haptic pressure to provide a haptic effect.

16 Claims, 13 Drawing Sheets

(51) Int. Cl.
*B60N 2/02* (2006.01)
*B60N 2/20* (2006.01)
*B60N 2/56* (2006.01)
*B60N 2/90* (2018.01)

(52) U.S. Cl.
CPC ............ *B60N 2/0277* (2023.08); *B60N 2/20* (2013.01); *B60N 2/5678* (2013.01); *B60N 2/90* (2018.02); *B60N 2/976* (2018.02); *B60N 2/003* (2023.08); *B60N 2/0268* (2023.08); *B60N 2210/20* (2023.08); *B60N 2210/26* (2023.08); *B60N 2210/40* (2023.08); *B60N 2220/10* (2023.08); *B60N 2220/20* (2023.08)

(56) References Cited

U.S. PATENT DOCUMENTS 11,046,225 B2    6/2021   Mergl et al.

| | | | | |
|---|---|---|---|---|
| 2007/0246979 | A1* | 10/2007 | Browne | B60N 2/806 |
| | | | | 297/216.12 |
| 2018/0224938 | A1 | 8/2018 | Min et al. | |
| 2019/0299830 | A1* | 10/2019 | Alequin | A61H 23/00 |
| 2020/0139870 | A1* | 5/2020 | Mergl | G06F 3/165 |
| 2021/0354612 | A1* | 11/2021 | Migneco | B60N 2/99 |
| 2022/0194410 | A1 | 6/2022 | Kim et al. | |
| 2023/0147411 | A1* | 5/2023 | Kim | B60N 2/003 |
| | | | | 180/272 |

FOREIGN PATENT DOCUMENTS

| | | |
|---|---|---|
| KR | 10-1731190 B1 | 4/2017 |
| KR | 10-1744716 B1 | 6/2017 |
| KR | 10-1856935 B1 | 5/2018 |
| KR | 10-2018-0092058 A | 8/2018 |
| KR | 10-2131390 B1 | 7/2020 |
| KR | 10-2021-0047674 A | 4/2021 |
| KR | 10-2022-0089738 A | 6/2022 |
| KR | 10-2023-0065801 A | 5/2023 |

* cited by examiner

APPARATUS AND METHOD FOR CONTROLLING VEHICLE SEAT

CROSS-REFERENCE TO RELATED APPLICATION

This application claims, under 35 U.S.C. § 119(a), the benefit of priority to Korean Patent Application No. 10-2021-0184311, filed in the Korean Intellectual Property Office on Dec. 21, 2021, the entire contents of which are incorporated herein by reference.

BACKGROUND

Technical Field

Embodiments of the present disclosure relate to an apparatus and method for controlling a vehicle seat so as to control a seat back and a neck pillow based on a sound.

Description of the Related Art

Electric vehicles, such as electric vehicles and hydrogen electric vehicles, are driven by electric motors. Thus, there is no engine sound, thereby making it difficult for pedestrians to recognize an approach of an electric vehicle thereto. In order to solve this problem, a Virtual Engine Sound System (VESS) and an Acoustic Vehicle Alert System (AVAS) that generate a virtual engine sound and allow pedestrians to recognize the electric vehicle approach have been developed, and compulsorily installed in electric vehicles.

In the VESS, the engine sound is realized using an Electronic Sound Generator (ESG). The ESG is mounted on an electric vehicle's cowl top panel. When an engine sound is generated, the ESG uses vehicle body vibration to generate an added sound (structural vibration sound). However, a joint is formed at a welding part of a cowl bracket of the vehicle body, on which the ESG is mounted, and a cowl top cover, and a quality cost for structural reinforcement and vibration insulation is excessive.

SUMMARY

An exemplary embodiment of the present disclosure provides an apparatus and method for controlling a vehicle seat so as to control alternate vibration of a seat back and a neck pillow based on a sound in a vehicle driving condition.

Further, an exemplary embodiment of the present disclosure provides an apparatus and method for controlling a vehicle seat that provides a massage function via a seat back and a neck pillow in a vehicle stopping condition or a user's rest condition.

According to an exemplary embodiment of the present disclosure, an apparatus for controlling a vehicle seat includes the vehicle seat installed in a vehicle and including a seat back and a neck pillow, a detector configured to detect vehicle information and seat information, and a processor connected to the vehicle seat and the detector, wherein the processor may be configured to determine a vehicle state and a seat sitting posture based on the vehicle information and the seat information, analyze a sound being reproduced in the vehicle, determine a haptic pattern and a haptic pressure based on the vehicle state and the seat sitting posture, and the analysis of the sound, and control the seat back and the neck pillow based on the determined haptic pattern and haptic pressure to provide a haptic effect.

The seat back may include a hugging device installed in the seat back, wherein the hugging device may include a support for supporting an upper body of a user sitting on the vehicle seat, and a movable portion pivotally coupled to the support via a hinge portion.

Each of the support and the movable portion may be made of a laminated sheet.

The neck pillow may include at least one of an air tube, a vibrator, a soft actuator or a heating wire.

The processor may be configured to select the haptic pattern based on the vehicle state and the seat sitting posture.

The processor may be configured to determine the haptic pattern and the haptic pressure via frequency and amplitude analysis of the sound.

The processor may be configured to select a climax of the sound, select the haptic pressure based on the sound, and determine a haptic timing based on the selected climax and the haptic pressure.

The processor may be configured to provide the haptic effect via alternate vibrations of the seat back and the neck pillow.

The processor may be configured to drive a hugging device in the seat back to activate a back hugging function.

The processor may be configured to determine a driver state based on driver information detected by the detector, and determine the haptic pattern and the haptic pressure based on the determined driver state, the vehicle state, and the seat sitting posture.

According to an exemplary embodiment of the present disclosure, a method for controlling a vehicle seat is provided which includes detecting a vehicle state and a seat sitting posture based on vehicle information and seat information detected by a detector, analyzing a sound being reproduced in the vehicle, determining a haptic pattern and a haptic pressure based on the vehicle state, the seat sitting posture, and the analysis of the sound, and controlling a seat back and a neck pillow based on the haptic pattern and the haptic pressure to provide a haptic effect.

The determining of the haptic profile and the haptic pressure may include selecting the haptic pattern based on the vehicle state and the seat sitting posture.

The determining of the haptic profile and the haptic pressure further may include determining the haptic pattern and the haptic pressure via frequency and amplitude analysis of the sound.

The determining of the haptic profile and the haptic pressure may include selecting a climax of the sound, selecting the haptic pressure based on the sound, and determining a haptic timing based on the selected climax and the haptic pressure.

The providing of the haptic effect may include providing the haptic effect via alternate vibrations of the seat back and the neck pillow.

The providing of the haptic effect may include controlling an operation of a hugging device disposed in the seat back so as to wrap an upper body of a user sitting on the vehicle seat.

The providing of the haptic effect may include controlling at least one of an air tube, a massager, or a heating wire of the neck pillow to provide the haptic effect.

In a further aspect, a vehicle is provided that comprises an apparatus as disclosed herein. In certain aspect, the vehicle may be an electric-powered vehicle.

Other aspects are disclosed infra.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
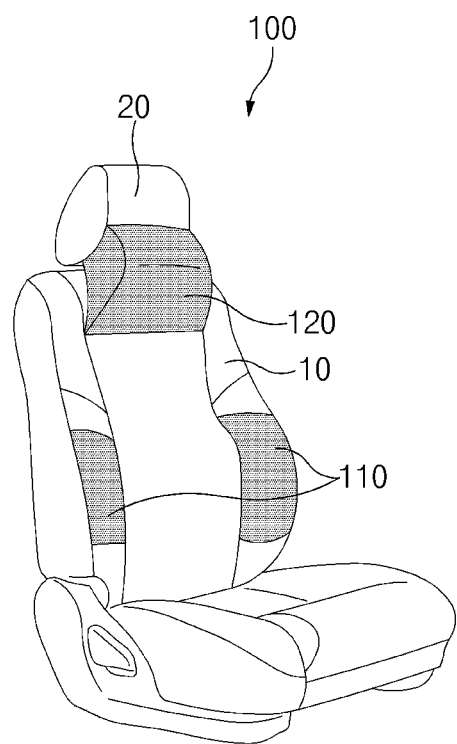
FIG. 1 is a view showing a structure of a vehicle seat according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
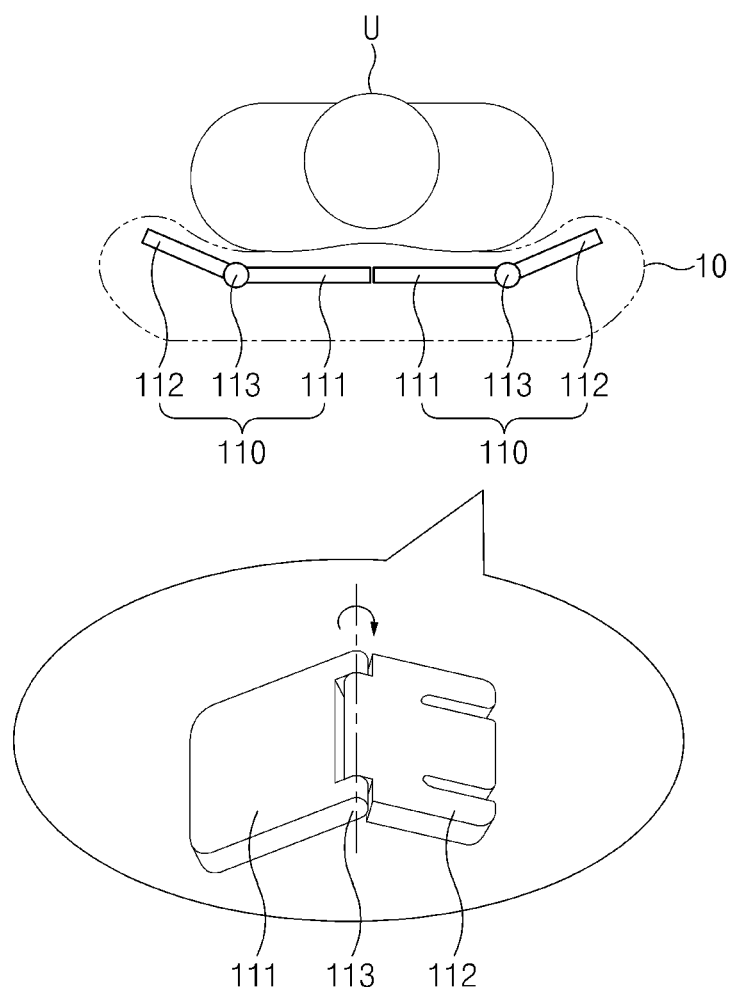
FIG. 2 is a diagram showing a structure of a hugging device according to embodiments of the present disclosure.
Figure 3A:
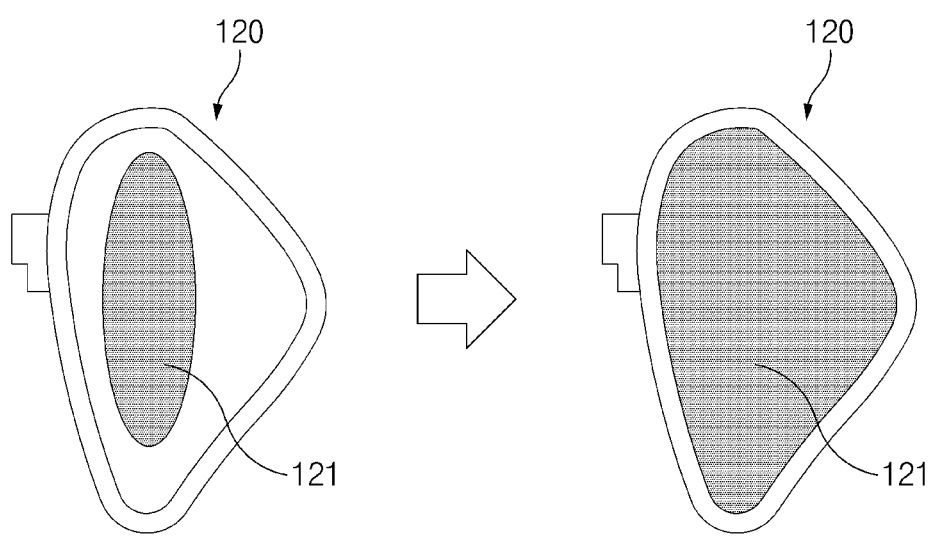
FIG. 3A to FIG. 3C are views showing a structure of a neck pillow according to embodiments of the present disclosure.
Figure 3B:
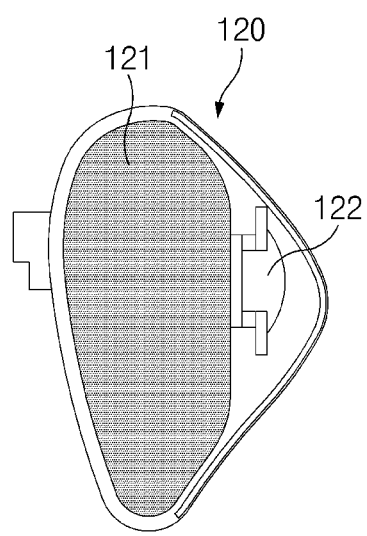
Figure 3C:
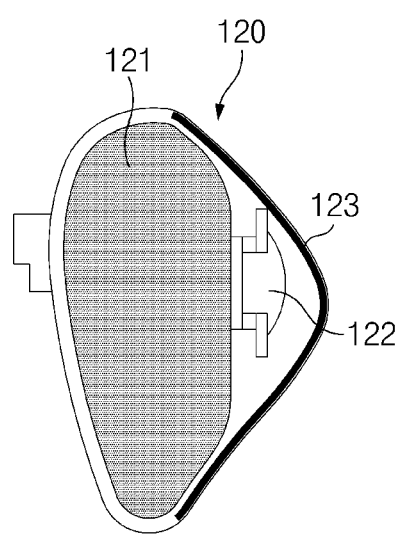

FIG. 1 is a view showing a structure of a vehicle seat according to embodiments of the present disclosure. FIG. 2 is a diagram illustrating a structure of a hugging device according to embodiments of the present disclosure. FIG. 3A to FIG. 3C are views showing a structure of a neck pillow according to embodiments of the present disclosure.

Referring to FIG. 1, a vehicle seat 100 may include a hugging device 110 and a neck pillow 120. The hugging device 110 may be installed in a seat back 10, and the neck pillow 120 may be disposed at a boundary between the seat back 10 and a headrest 20 in an attachable or detachable manner.

The hugging device 110 may be configured to provide a back hugging effect (haptic effect) surrounding an upper body of a user U sitting on the vehicle seat. The hugging device 110 may be implemented in a form of a kinematic device or a soft actuator. The hugging device 110 may be installed in a foam pad of the seat back 10. The foam pad may be made of a material such as bio-polyurethane. Two hugging devices 110 may be installed symmetrically at both opposing sides of the seat back 10, respectively. A shape of the hugging device 110 may be designed based on a vibration stimulation point of a palm.

Referring to FIG. 2, the hugging device 110 may include a support 111, a movable portion 112, and a hinge portion 113. The support 111 may serve to support the user U's body and/or a portion thereof, such as a wrist, when a back hugging function is activated. The support 111 may be made of high rigidity and lightweight thermoplastic composite material such as a laminated sheet. The movable portion 112 may serve to and be configured to wrap the user U's body and/or a portion thereof, such as a finger, when the back hugging function is activated. The movable portion 112 may be pivotally coupled to the support 111 via the hinge portion 113. The hinge portion 113 may extend and be fixed via welding after a mounting angle design is selected.

The neck pillow 120 may be configured to provide a haptic effect to a neck of the user sitting on the vehicle seat. For example, the neck pillow 120 may be configured to support, massage, or steam the user's neck. The neck pillow 120 may include an air tube 121 that expands or contracts by an amount of injected air, as shown in FIG. 3A. Further, the neck pillow 120 may include the air tube 121 and a massager 122, as shown in FIG. 3B. The massager 122 may be implemented as a vibrator that generates vibration to tap the user's neck and/or a soft actuator that massages the user's neck. Further, the neck pillow 120 may include the air tube 121, the massager 122, and a heating wire 123, as shown in FIG. 3C. The heating wire 123 may be configured to generate heat to control a temperature of the neck pillow 120.

Figure 4:
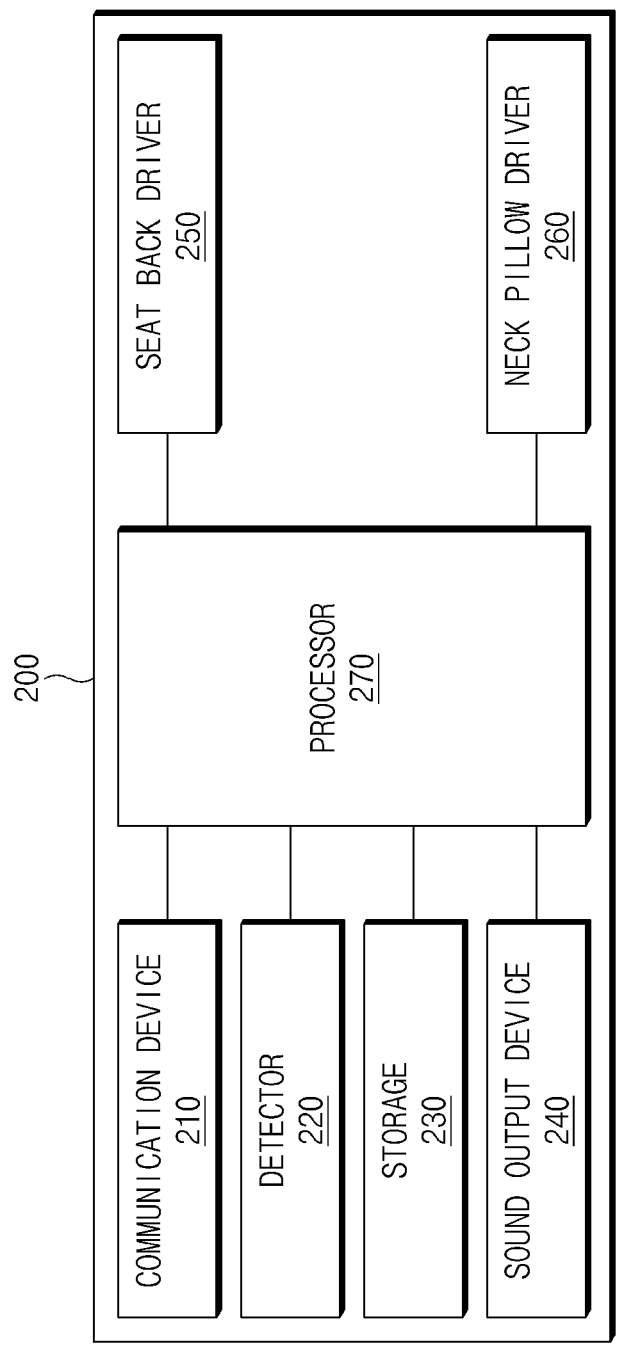
FIG. 4 is a block diagram showing an apparatus configured for controlling a vehicle seat according to embodiments of the present disclosure.
Figure 5A:
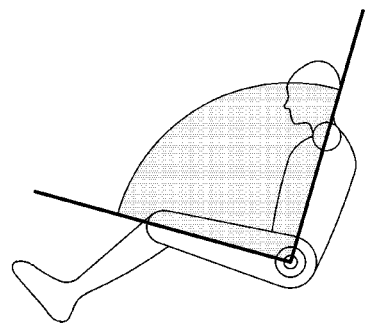
FIG. 5A and FIG. 5B are exemplary views showing a seat sitting posture in a stop condition related to the present disclosure.
Figure 5B:
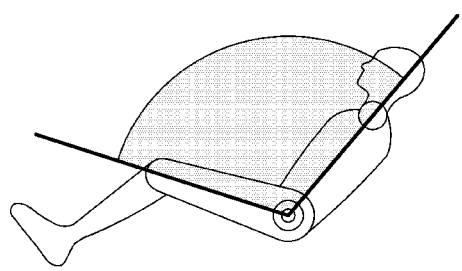
Figure 6:
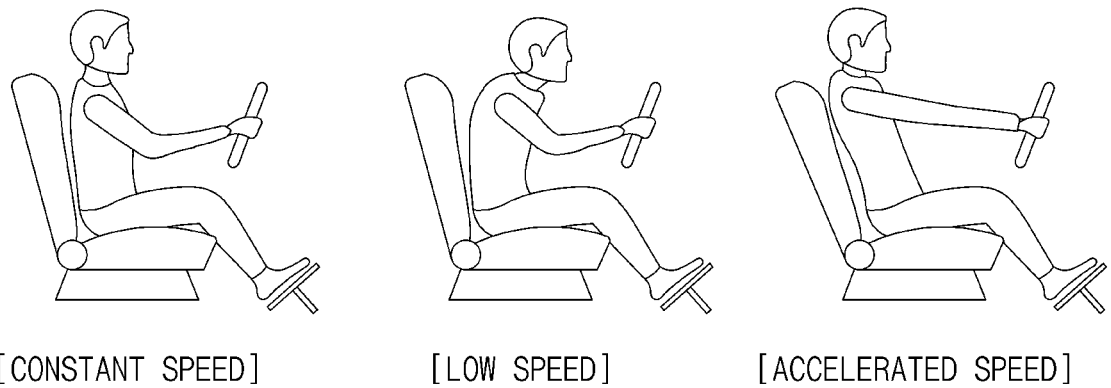
FIG. 6 is an exemplary diagram showing a seat sitting posture in a driving condition related to the present disclosure.
Figure 7:
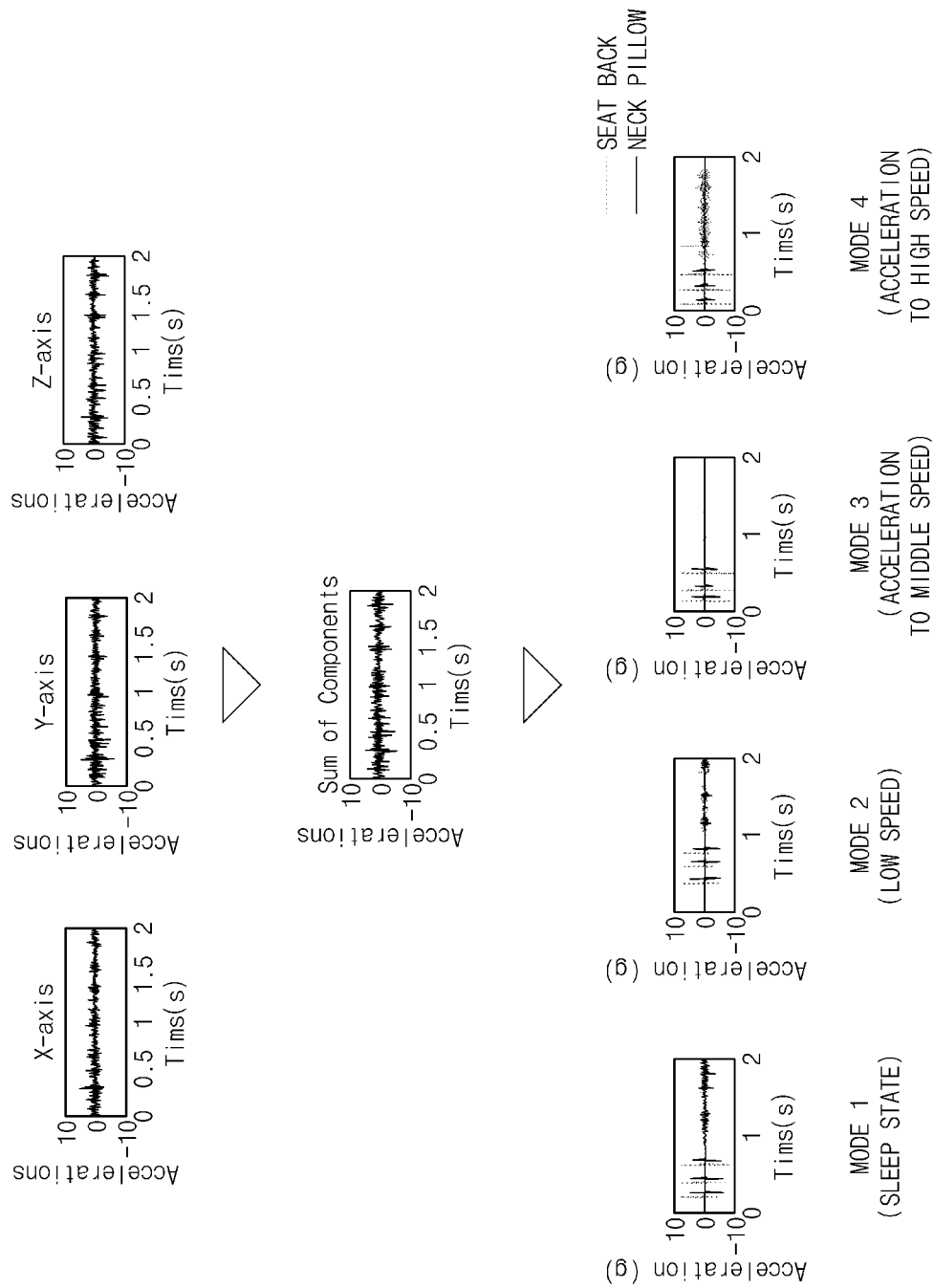
FIG. 7 is an exemplary diagram illustrating a haptic pattern according to embodiments of the present disclosure.

FIG. 4 is a block diagram showing an apparatus configured for controlling a vehicle seat according to embodiments of the present disclosure. FIG. 5A and FIG. 5B are exemplary views showing a seat sitting posture in a stop condition related to the present disclosure. FIG. 6 is an exemplary diagram showing a seat sitting posture in a driving condition related to the present disclosure. FIG. 7 is an exemplary diagram illustrating a haptic pattern according to embodiments of the present disclosure.

Referring to FIG. 4, an apparatus 200 configured for controlling the vehicle seat may include a communication device 210, a detector 220, storage 230, a sound output device 240, a seat back driver 250, a neck pillow driver 260, and a processor 270, and the like.

The communication device 210 may be configured to support the apparatus 200 for controlling the vehicle seat to perform communication with Electronic Control Units (ECUs) mounted on the vehicle. The communication device 210 may include a transceiver configured to transmit and receive data information using vehicle communication technologies such as Controller Area Network (CAN) and Ethernet.

The communication device 210 may be configured to support the apparatus 200 for controlling the vehicle seat to perform wired communication and/or wireless communication with an external electronic device, such as a terminal and a server. For example, the communication device 210 may be configured to download a sound source via communication with the server that provides the sound source. The communication device 210 may include a wired communication circuit such as a local area network (LAN) communication circuit and/or a power line communication circuit, and/or a wireless communication circuit such as a cellular communication circuit, a short-range wireless communication circuit, and/or a global navigation satellite system (GNSS) communication circuit, and the like.

The detector 220 may be configured to detect vehicle information, such as driving information, vehicle indoor/outdoor environment information, and/or driver information. The detector 220 may be configured to use at least one sensor mounted on the vehicle and/or at least one Electronic Control Unit (ECU) to detect a vehicle speed, seat information, motor Revolution Per Minute (RPM), an accelerator pedal open value, a throttle open value, vehicle information such as an internal temperature of the vehicle and/or an external temperature. The sensor may include Accelerator Position Sensor (APS), a throttle position sensor, a Global Positioning System (GPS) sensor, a wheel speed sensor, a temperature sensor, a microphone, an image sensor, an Advanced Driver Assistance System (ADAS) sensor, a 3-axis accelerometer, and/or Inertial Measurement Units (IMUs). The ECU may include a motor control unit (MCU) and/or a vehicle control unit (VCU), and the like. The detector 220 may be configured to detect driver information using an ultrasonic sensor, radar, and/or a driver monitoring system (DMS), or the like. The driver information may be used to determine the driver's state.

The storage 230 may be configured to store therein a haptic profile (haptic pattern) for each haptic mode. The storage 230 may be configured to store a sound source such as a music sound, a driving sound, a virtual sound and/or a warning sound. The storage 230 may be configured to store therein an emotional model, a virtual sound design algorithm, a volume setting algorithm, a volume control logic and/or a sound equalizer logic, and the like. The emotional model may be implemented based on a sound-based emotional factor and a dynamic characteristic-based emotional factor. The virtual sound design algorithm may be obtained by adding an Engine Sound Equalizer (ESE) logic for personalization to an existing Active Sound Design (ASD) function, based on a target profile and engine information such as RPM, throttle and/or torque, and the like and may be configured to design a performance sound of the vehicle.

The storage 230 may be a non-transitory storage medium that is configured to store instructions executed by the processor 270. The storage 230 may include at least one of storage media such as Random Access Memory (RAM), Static Random Access Memory (SRAM), Read Only Memory (ROM), Programmable Read Only Memory (PROM), Electrically Erasable and Programmable ROM (EEPROM), Erasable and Programmable ROM (EPROM), Hard Disk Drive (HDD), Solid State Disk (SSD), embedded multimedia card (eMMC), universal flash storage (UFS), and/or web storage.

The sound output device 240 may be configured to reproduce a sound source that is pre-stored or streamed in real time and output the same to an outside. The sound output device 240 may include an amplifier and/or a speaker. The amplifier may be configured to amplify an electrical signal of a music sound reproduced by the sound output device 240. A plurality of speakers may be installed at different locations inside and/or outside the vehicle, and may be configured to convert the electric signal amplified by the amplifier into sound waves.

The seat back driver 250 may be configured to drive the hugging device 110 in the seat back 10 shown in FIG. 1 and FIG. 2 to implement a haptic effect. The haptic effect refers to an effect such as a back hugging effect that the user may experience using a sense such as a tactile sense. The seat back driver 250 may be configured to adjust a vibration and/or hugging pressure of the seat back. The seat back driver 250 may include a vibrator that is configured to generate vibration. Further, the seat back driver 250 may include a small Direct Current (DC) motor for rotating the movable portion 112 of the hugging device 110. The small DC motor may be fastened to the hinge portion 113 via a screw thread or via coupling between a motor protrusion and a hinge slot hole. The seat back driver 250 may be configured to control the movable portion 112 of the hugging device 110 to adjust the hugging pressure.

The neck pillow driver 260 may be configured to implement a haptic effect using the neck pillow. The neck pillow driver 260 may be configured to adjust an amount of air inside the air tube 121 of the neck pillow 120 according to a command from the processor 270. The neck pillow driver 260 may be configured to control the massager 122 such as a vibrator and/or a soft actuator of the neck pillow 120 to adjust a vibration pattern, a vibration pressure, a massage pattern and/or a massage pressure. The neck pillow driver 260 may be configured to control the heating wire 123 to control the temperature of the neck pillow 120.

The processor 270 may be electrically connected to each of the components 210 to 260. The processor 270 may be configured to control an operation of each of the components 210 to 260. The processor 270 may include at least one processing device such as, e.g., Application Specific Integrated Circuit (ASIC), Digital Signal Processor (DSP), Programmable Logic Device (PLD), Field Programmable Gate Array (FPGA), Central Processing Unit (CPU), a microcontroller and/or a microprocessor.

The processor 270 may be configured to recognize an emotional state of a user (e.g., a driver) using the emotional model. The processor 270 may be configured to generate a virtual sound based on the user's emotional state. The processor 270 may be configured to use the virtual sound design algorithm when generating the virtual sound. The virtual sound may include an engine sound, a driving sound, an emotional sound (an emotional care sound), and the like. The processor 270 may be configured to adjust a volume and/or sound quality of a music based on the emotional state of the user to generate a sound (music sound). The processor 270 may be configured to transmit the generated sound to the sound output device 240. The sound output device 240 may be configured to reproduce and output sound according to a command from the processor 270.

The processor 270 may be configured to determine a vehicle state based on vehicle information detected by the detector 220. The vehicle state may be classified into a stop state and a driving state. The processor 270 may be configured to determine the vehicle state based on a vehicle speed and/or gear information such as Drive, Park, and the like. Further, the processor 270 may be configured to detect a seat sitting posture based on the seat information detected by the detector 220.

The processor 270 may be configured to provide different haptic effects such as back hugging or massage effects, using the seat back 10 and/or the neck pillow 120 based on the vehicle state and/or the seat sitting posture. The processor 270 may be configured to not activate the haptic function when the vehicle state is the stop state and the seat sitting posture is a normal posture, or when the vehicle state is a driving state and the seat sitting posture is a constant speed driving posture. The processor 270 may be configured to activate the haptic function when the vehicle state is the normal state and the seat sitting posture is a fatigue reduction posture, or when the vehicle state is the driving state and the seat sitting posture is a low speed or accelerated driving posture.

Specifically, when the vehicle state is the normal state and the seat sitting posture is the fatigue reduction posture, the processor 270 may be configured to control the haptic pattern and the haptic pressure of the seat back 10 and/or the neck pillow 120 based on the sound to provide a massage function. Further, when the vehicle state is the driving state and the seat sitting posture is the low speed or accelerated driving posture, the processor 270 may be configured to control the haptic pattern and the haptic pressure of the seat back 10 and/or the neck pillow 120 based on the vehicle speed and the sound to provide the back hugging function.

The processor 270 may be configured to set a back hugging pressure when executing the back hugging function. The back hugging pressure may be set based on a maximum pressure during seat sitting among evaluation factors for seat comfort, and may be set to a value within a range of 0.15 to 0.25 kg/cm'. For example, the back hugging pressure may be preset to 0.15 kg/cm' as a first level, 0.2 kg/cm' as a second level, and 0.25 kg/cm' as a third level based on a seat comfort evaluation result. A seat pressure distribution (SPD) may be used to develop a back hugging system using the seat back and the neck pillow, based on back hug emotion. The SPD may be expressed as in [Equation 1], and becomes smaller as a body pressure acts evenly on the seat.

$$SPD(\%) = \frac{\sum_{i=1}^{n}(P_i - P_m)^2}{nP_m^2} \times 100 \qquad \text{[Equation 1]}$$

In this connection, $P_i$ is a pressure acting on a sensor of a seat contact surface, and $P_m$ is an average pressure against a contact area.

The processor 270 may be configured to detect the seat sitting posture of the user sitting on the vehicle seat. The processor 270 may be configured to determine the seat sitting posture based on an analyzing result of body pressure distribution and position of the seat back and cushion of the vehicle seat. For example, when the user is taking a normal posture, as shown in FIG. 5A, in the stop state (stop condition), the processor 270 may be configured to determine that the vehicle state is the stop state and the seat sitting posture is the normal posture. When the user is taking the fatigue-reducing posture, as shown in FIG. 5B, in the stop state, the processor 270 may be configured to determine that the vehicle state is the normal state and the seat sitting posture is a resting posture (fatigue-reducing posture).

The processor 270 may be configured to classify the seat sitting posture in the driving state (driving condition) into three postures, as shown in FIG. 6. That is, the processor 270 may be configured to classify the seat sitting posture into a constant speed driving posture, a low speed driving posture, and an accelerated driving posture.

The processor 270 may be configured to determine a haptic mode based on the vehicle state and the seat sitting posture. The haptic mode may be classified into four modes based on the vehicle state and the seat sitting posture. In a first mode (mode 1), the seat sitting posture is the fatigue reduction posture in which the seat back is tilted back in the stop state, and thus an emotional care haptic pressure may be set to a low level based on a human body modeling in which the user takes a rest (sleep). In a second mode (mode 2), the user drives the vehicle at a low speed due to traffic congestion, and thus the emotional care haptic pressure may be set to a low level in consideration of the human body modeling. In a third mode (mode 3), a vehicle speed is accelerated in a medium speed range of 70 kph to 110 kph, and thus the emotional care haptic pressure may be set to a middle level based on the human body modeling. In a fourth mode (mode 4), a vehicle speed is accelerated in a high speed range of 110 kph to 140 kph, and thus the emotional care haptic pressure may be set to a high level based on the human body modeling. Further, when determining the haptic mode, the processor 270 may be configured to determine the driver state based on driver information and determine the haptic mode in consideration of the determined driver state, the vehicle state, and the seat sitting posture.

The processor 270 may be configured to select a haptic pattern profile (a haptic pattern, and a haptic profile) based on the haptic mode. The processor 270 may be configured to select the haptic pattern of each of the seat back and the neck pillow corresponding to the determined haptic mode. The haptic pattern profile may be obtained as a sum of acceleration profiles in X-axis, Y-axis, and Z-axis directions over time in the stop condition or the driving condition. The processor 270 may be configured to select an alternate haptic pattern of a regular pressure or an alternate haptic pattern of a variable pressure.

The processor 270 may be configured to select the haptic pressure based on the sound reproduced in the vehicle. The haptic pressure may be selected based on biomechanical properties of a muscle and viscoelastic properties of a muscle tissue. The biomechanical properties of the muscle may include stiffness, and elasticity of the muscle. The muscle stiffness refers to resistance of the muscle tissue against an external force in an initial muscle state. That is, the stiffness refers to a magnitude of a force required to cause displacement of a muscle fiber tissue due to muscle contraction. The elasticity of the muscle refers to an ability to recover to an initial muscle shape after reduction or removal of the external force, and may be expressed as a vibration decrement. The viscoelastic properties of the muscle tissue may include a relaxation time of a muscle, a muscle creep, and the like. The relaxation time of the muscle represents a time it takes for the muscle to restore to a normal state after the muscle contraction or external stress is removed. The muscle creep refers to a ratio of the relaxation time and a time it takes for the muscle to be deformed from a relaxed state as an initial state thereof and then return to the initial state.

The processor 270 may be configured to select a climax of the sound. The processor 270 may perform Short Time Fourier Transform (STFT) on the sound source to obtain an average value of an amplitude thereof via Fast Fourier Transform (FFT) on each of the sections thereof. The processor 270 may be configured to compare the average values of the sections with each other and may determine a section having a higher average value than all the average values, and may select the section with the highest sound pressure (volume) as the climax. Further, the processor 270 may be configured to determine the haptic pressure based on the sound. The processor 270 may be configured to select an emotional timing based on the selected climax and the determined haptic pressure.

The processor 270 may be configured to analyze a frequency and an amplitude of the sound [Table 1]. A realistic feeling may be realized via classification of bass, middle, and treble and information on a pitch of the sound. The processor 270 may be configured to convert a time-based sound source into a frequency-based one using FFT to calculate energy of music and energy in each sound band during frequency analysis. Further, the processor 270 may be configured to analyze information on the pitch of the music sound and/or the driving sound via the amplitude analysis.

TABLE 1

| Order | Frequency | | Amplitude |
| --- | --- | --- | --- |
| | Music sound | Driving sound | Sound source |
| 1 | Bass | Booming | Measurement |
| 2 | Low-mid | Rumble | DATA |
| 3 | Mid-mid | Combustion Noise | |
| 4 | Upper-mid | High freq. Noise | |
| 5 | Treble | | |

The processor 270 may be configured to select a sound-based haptic pattern via frequency and amplitude analysis of the sound. The processor 270 may be configured to select a haptic profile having a regular pattern and pressure or a haptic profile having a variable pattern and pressure. The haptic profile may correspond to a vibration excitation profile applied based on an emotional care resulting from an alternate vibration of the seat back and the neck pillow. The processor 270 may be configured to emotionally convert the music sound and/or the driving sound into a haptic pattern. The processor 270 may be configured to implement a haptic effect based on a sound-based climax timing, the haptic pattern, and the haptic pressure via the emotional conversion.

The processor 270 may be configured to disable the back hugging function in the normal posture in the stop state or in the constant speed driving posture in the driving state. The processor 270 may be configured to adjust the back hugging pressure to a 1 level (low) in the fatigue reduction posture in the stop situation or in the low-speed driving posture in the driving state. That is, when the haptic mode is determined to be the first mode or the second mode, the processor 270 may be configured to adjust the back hugging pressure to the low level. Upon determining that the haptic mode is the third mode in which the sitting posture is the middle speed accelerated driving posture in the driving state, the processor 270 may be configured to adjust the back hugging pressure to a 2 level (middle). Upon determining that the haptic mode is the fourth mode in which the sitting posture is the high speed accelerated driving posture in the driving state, the processor 270 may be configured to adjust the back hugging pressure to a 3 level (high).

The processor 270 may be configured to provide a haptic effect in consideration of each of the seat back and neck pillow haptic profiles based on the climax selection result, the frequency and amplitude analysis result, and the body pressure distribution in a sleep situation in the stop state. The processor 270 may be configured to select the neck pillow haptic profile in consideration of a speaker sound under the driving condition, and select the seat back haptic profile in consideration of an exhaust sound. The processor 270 may be configured to control the seat back driver 250 and the neck pillow driver 260 based on the haptic profiles selected in the driving condition to provide the haptic effect.

The processor 270 may be configured to determine a vibration pattern and a vibration excitation force based on the sound. The processor 270 may be configured to sense the sound reproduced in the vehicle. The processor 270 may be configured to use the detector 220 to detect vehicle environment information such as internal environment information of the vehicle and external environment information thereto. The vehicle environment information may include at least one of information such as a seat environment, a driving environment, a sound of a reproduced music, and/or a surrounding image (a surrounding situation). The processor 270 may be configured to determine whether to use a low-pass filter. The processor 270 may be configured to determine which frequency band of the sensed sound is to be used for vibration implementation. When it is determined that the low-pass filter is to be used, the processor 270 may be configured to filter a low-frequency band from the sound. The processor 270 may be configured to extract a sound of a low-pitched portion of the reproduced music. The processor 270 may be configured to determine whether to perform customized vibration processing on the filtered sound. The processor 270 may be configured to determine whether to perform customized vibration processing on the sound of the low-pitched portion. When it is determined that the low-pass filter is not to be used, the processor 270 may be configured to filter a predetermined frequency band (a high-frequency band or a high-pitched portion) from the sound. When it is determined to perform customized vibration processing on the low-pass filtered sound or when a sound of a predetermined frequency band is filtered, the processor 270 may be configured to perform the customized vibration processing (conversion). The customized vibration processing may refer to logic that generates a specific frequency by a size of an input waveform and may generate a low-pitched frequency although a high-frequency waveform is present. The processor 270 may be configured to perform vibration compensation using the low-pass filtered and/or customized vibration-processed signal to determine the vibration pattern and the vibration excitation force. The processor 270 may be configured to implement seat vibration based on information such as the seat environment, the driving environment, the reproduced music sound, and/or the surrounding image. To this end, the processor 270 may be configured to determine an appropriate frequency of the vibration signal based on the user's weight. The processor 270 may be configured to determine an optimal vibration pattern (e.g., a level and a peak time), based on whether a back of the user is in close contact with the seat back, a surface pressure distribution area, and/or a load balance. The processor 270 may be configured to implement sound-based vibration with referring to the sound of the reproduced music and the surrounding image information (warning of risk factors other than pedestrians). The processor 270 may be configured to correct the vibration excitation force in each of a front-rear direction (X direction) of the seat back and a vertical direction (Z direction) of a seat cushion, based on the driving environment, the surrounding condition, and/or the sound of the reproduced music. Thereafter, the processor 270 may be configured to generate vibration of each of the seat back 10 and the neck pillow 120 based on the determined vibration pattern and vibration excitation force.

Figure 8:
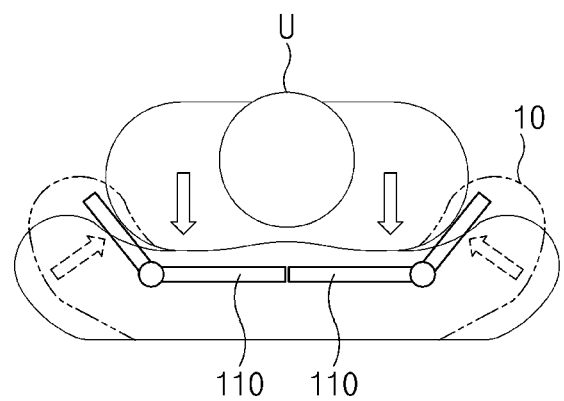
FIG. 8 is a view showing an operation example of a hugging device according to embodiments of the present disclosure.
Figure 9:
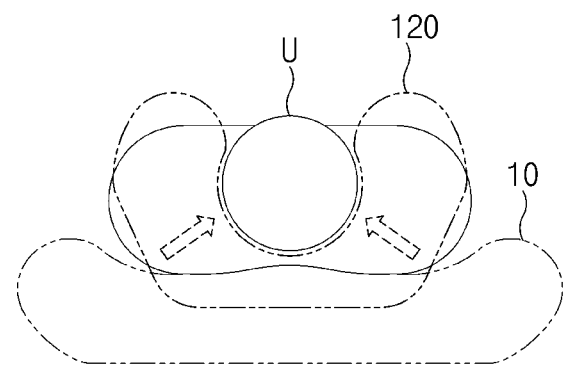
FIG. 9 is a view showing an operation example of a neck pillow according to embodiments of the present disclosure.

FIG. 8 is a diagram illustrating an operation example of a hugging device according to embodiments of the present disclosure. FIG. 9 is a view showing an operation example of a neck pillow according to embodiments of the present disclosure.

The hugging device 110 may be configured to execute a back hugging function that wraps and hugs left and right upper body portions of the user U while the user U is pushed in a rearward direction relative to a vehicle traveling direction due to constant speed driving, low speed start, slow acceleration or rapid acceleration in the driving condition. When the back hugging function is activated, the hugging device 110 is configured to generate vibration excitation in an alternate manner with vibration excitation from the neck pillow 120 to provide a healing effect so that the user U may feel the driving acceleration with his/her whole body.

In the stop condition or the rest condition, the hugging device 110 and the neck pillow 120 of the seat back may serve as a support for supporting the upper body and the neck of the user U in consideration of the seat sitting posture of the user U. Further, the hugging device 110 and the neck pillow 120 may be configured to provide a massage function. The hugging device 110 may be configured to provide a massage function using a kinematic hinge, and the neck pillow 120 may provide a massage function via change in an air pressure.

Figure 10:
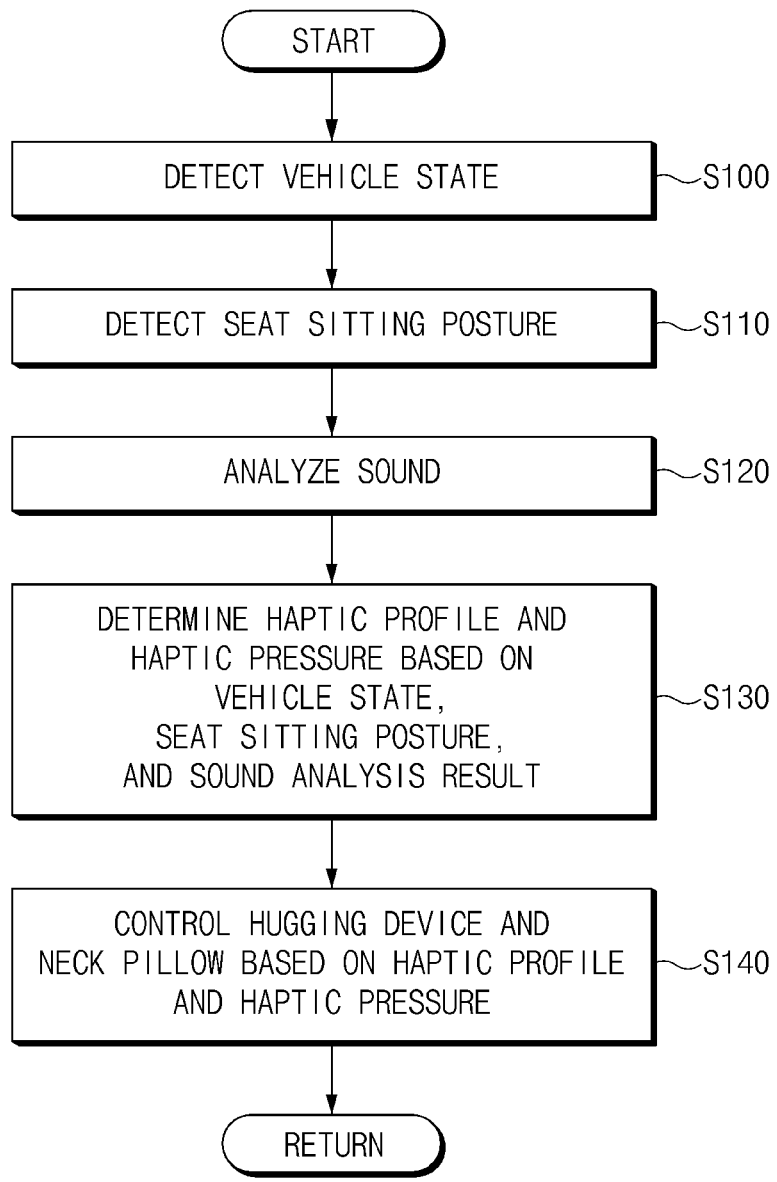
FIG. 10 is a flowchart illustrating a vehicle seat control method according to embodiments of the present disclosure.

FIG. 10 is a flowchart illustrating a vehicle seat control method according to embodiments of the present disclosure.

Referring to FIG. 10, the processor 270 may detect the vehicle state in S100. The vehicle state may be classified into the stop state and the driving state. The processor 270 may determine the vehicle state based on the vehicle information detected by the detector 220.

The processor 270 may be configured to detect the seat sitting posture in S110. The processor 270 may be configured to determine the seat sitting posture based on the seat information detected by the detector 220. The seat sitting posture may be classified into the normal posture, the fatigue reduction posture, the constant speed driving posture, the low speed driving posture and/or the accelerated driving posture, and the like.

The processor 270 may be configured to analyze the sound reproduced in the vehicle in S120.

The processor 270 may be configured to determine the haptic profile and the haptic pressure based on the vehicle state, the seat sitting posture, and the analysis of the sound in S130. The processor 270 may be configured to select the haptic profile based on the vehicle state and the seat sitting posture. The processor 270 may be configured to determine the haptic pressure based on the climax of the sound and the frequency and amplitude analysis results.

The processor 270 may be configured to control the hugging device 110 and the neck pillow 120 based on the haptic profile and the haptic pressure in S140. The processor

270 may be configured to control the seat back driver 250 and the neck pillow driver 260 based on the haptic profile so that the seat back 10 and the neck pillow 120 may be configured to generate vibrations alternately. The processor 270 may be configured to control the hugging device 110 and the neck pillow 120 of the seat back 10 to provide a massage function to massage the user's upper body and neck.

Figure 11:
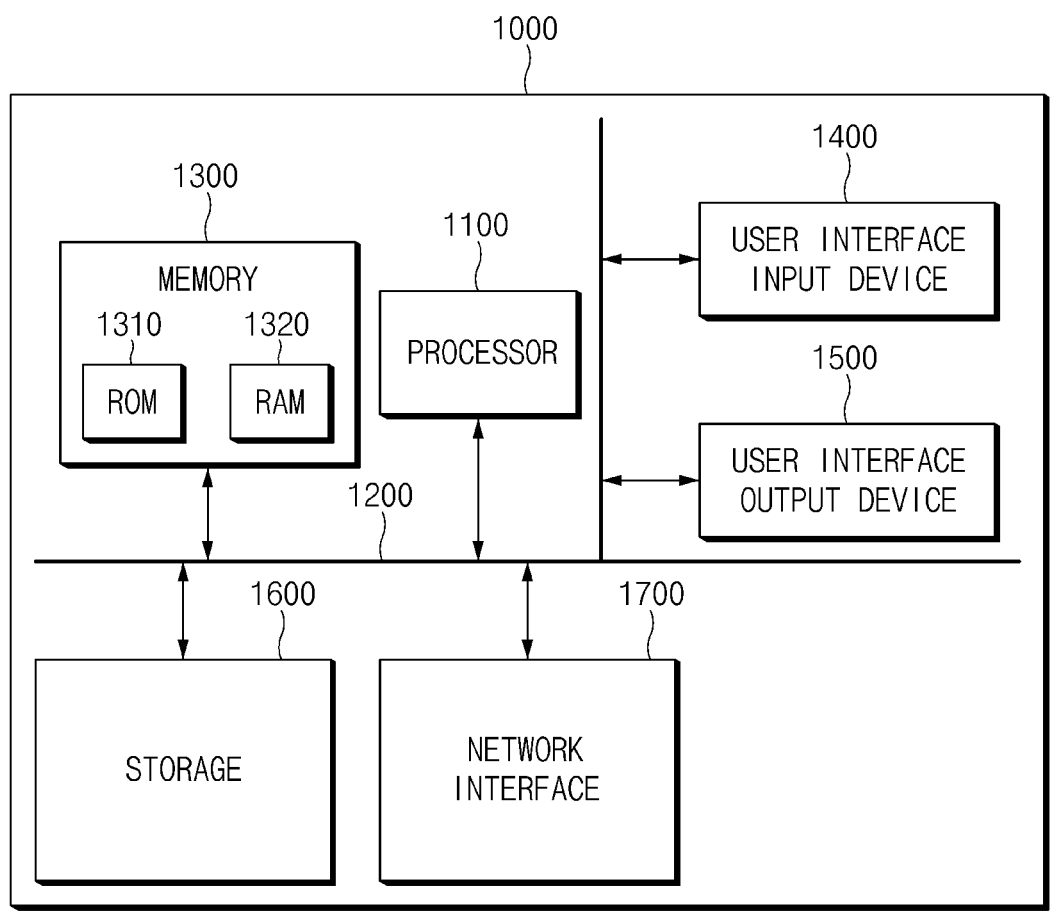
FIG. 11 is a block diagram showing a computing system configured for executing a vehicle seat control method according to embodiments of the present disclosure.

FIG. 11 is a block diagram showing a computing system for executing a vehicle seat control method according to embodiments of the present disclosure.

Referring to FIG. 11, a computing system 1000 may include at least one processor 1100, a memory 1300, a user interface input device 1400, a user interface output device 1500, storage 1600, and a network interface 1700 connected to each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include Read Only Memory (ROM) 1310 and Random Access Memory (RAM) 1320.

Thus, the operations of the method or the algorithm described in connection with the embodiments disclosed herein may be embodied directly in hardware or in a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may be configured to read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to the present disclosure, the alternate vibrations of the seat back and the neck pillow may be controlled based on the sound in the vehicle driving condition, thereby maximizing the user's healing emotion.

Further, according to the present disclosure, an emotional care solution such as a massage function from the seat back and the neck pillow may be provided in the vehicle stop condition or the user rest condition, thereby providing the user's healing emotion.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a vehicle seat, the apparatus comprising:
    a vehicle seat installed in a vehicle and comprising a seat back and a neck pillow;
    a detector for detecting vehicle information and seat information; and
    a processor connected to the vehicle seat and the detector, wherein the processor is configured to:
        determine a vehicle state and a seat sitting posture based on the vehicle information and the seat information;
        analyze a sound being reproduced in the vehicle;
        determine a haptic pattern and a haptic pressure based on the vehicle state, the seat sitting posture, and an analysis of the sound; and
        control the seat back and the neck pillow, based on the determined haptic pattern and haptic pressure, to provide a haptic effect; and
    wherein the processor is further configured to:
        select a climax of the sound;
        select the haptic pressure based on the sound, and determine a haptic timing based on the selected climax and haptic pressure.

2. The apparatus of claim 1, wherein the seat back comprises a hugging device installed in the seat back, wherein the hugging device comprises:
    a support for supporting an upper body of a user sitting on the vehicle seat; and
    a movable portion pivotally coupled to the support via a hinge portion.

3. The apparatus of claim 2, wherein the support and the movable portion are each made of a laminated sheet.

4. The apparatus of claim 1, wherein the neck pillow comprises at least one of an air tube, a vibrator, a soft actuator or a heating wire.

5. The apparatus of claim 1, wherein the processor is further configured to select the haptic pattern based on the vehicle state and the seat sitting posture.

6. The apparatus of claim 1, wherein the processor is further configured to determine the haptic pattern and the haptic pressure via frequency and amplitude analysis of the sound.

7. The apparatus of claim 1, wherein the processor is further configured to provide the haptic effect via alternate vibrations of the seat back and the neck pillow.

8. The apparatus of claim 1, wherein the processor is further configured to drive a hugging device in the seat back to activate a back hugging function.

9. The apparatus of claim 1, wherein the processor is further configured to:
    determine a driver state based on driver information detected by the detector; and
    determine the haptic pattern and the haptic pressure based on the determined driver state, the vehicle state, and the seat sitting posture.

10. A vehicle comprising an apparatus of claim 1.

11. A method for controlling a vehicle seat, the method comprising:
    detecting a vehicle state and a seat sitting posture based on vehicle information and seat information detected by a detector;
    analyzing a sound being reproduced in a vehicle;

determining a haptic profile and a haptic pressure based on the vehicle state, the seat sitting posture, and an analysis of the sound; and controlling a seat back and a neck pillow based on the haptic profile and the haptic pressure to provide a haptic effect;

wherein the determining of the haptic profile and the haptic pressure comprises:
  selecting a climax of the sound;
  selecting the haptic pressure based on the sound; and
  determining a haptic timing based on the selected climax and haptic pressure.

12. The method of claim 11, wherein the determining of the haptic profile and the haptic pressure comprises selecting the haptic profile based on the vehicle state and the seat sitting posture.

13. The method of claim 11, wherein the determining of the haptic profile and the haptic pressure further comprises determining the haptic profile and the haptic pressure via frequency and amplitude analysis of the sound.

14. The method of claim 11, wherein the providing of the haptic effect comprises providing the haptic effect via alternate vibrations of the seat back and the neck pillow.

15. The method of claim 11, wherein the providing of the haptic effect comprises controlling an operation of a hugging device disposed in the seat back so as to wrap an upper body of a user sitting on the vehicle seat.

16. The method of claim 11, wherein the providing of the haptic effect comprises controlling at least one of an air tube, a massager, and a heating wire of the neck pillow to provide the haptic effect.

* * * * *